(12) United States Patent
Hodgson et al.

(10) Patent No.: US 12,006,874 B2
(45) Date of Patent: Jun. 11, 2024

(54) 3D PRINTED ACOUSTIC PANEL WITH LATTICE STRUCTURE SUPPORT LAYER

(71) Applicant: Rolls-Royce Corporation, Indianapolis, IN (US)

(72) Inventors: Benedict N. Hodgson, Indianapolis, IN (US); Jeff Higbie, Indianpolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 78 days.

(21) Appl. No.: 17/651,021

(22) Filed: Feb. 14, 2022

(65) Prior Publication Data
US 2023/0258132 A1  Aug. 17, 2023

(51) Int. Cl.
| | |
|---|---|
| *F02C 7/24* | (2006.01) |
| *B33Y 10/00* | (2015.01) |
| *B33Y 80/00* | (2015.01) |
| *G10K 11/162* | (2006.01) |

(52) U.S. Cl.
CPC ............... *F02C 7/24* (2013.01); *B33Y 10/00* (2014.12); *B33Y 80/00* (2014.12); *G10K 11/162* (2013.01); *F05D 2220/32* (2013.01); *F05D 2260/96* (2013.01); *F05D 2300/603* (2013.01)

(58) Field of Classification Search
CPC .......... F02C 7/24; B33Y 10/00; B33Y 80/00; G10K 11/162; F05D 2230/32; F05D 2260/96; F05D 2300/603
See application file for complete search history.

(56) References Cited

U.S. PATENT DOCUMENTS

| | | | |
|---|---|---|---|
| 10,783,869 B2 | 9/2020 | Alstad | |
| 10,808,399 B2 | 10/2020 | Alstad et al. | |
| 10,830,102 B2* | 11/2020 | Martin | B22F 5/009 |
| 11,034,460 B2 | 6/2021 | Renwick et al. | |
| 11,092,077 B2* | 8/2021 | Joshi | B32B 15/20 |
| 11,195,504 B1* | 12/2021 | Hammetter | B33Y 80/00 |
| 2013/0048206 A1 | 2/2013 | Henkle et al. | |
| 2016/0152314 A1 | 6/2016 | Carlsten et al. | |
| 2017/0058985 A1 | 3/2017 | Martino Gonzalez et al. | |
| 2018/0018952 A1* | 1/2018 | Herrera | B32B 27/20 |
| 2019/0234313 A1 | 8/2019 | Kray et al. | |

(Continued)

FOREIGN PATENT DOCUMENTS

WO    WO-2022234228 A2 * 11/2022

OTHER PUBLICATIONS

Iervolino, "Additive Manufacturing of High Temperature Resistant Thermoplastic Composites and Sandwich Panels for Broadband Sound Absorption", Oct. 3, 2019, 3 pp., Retrieved from https://www.politesi.polimi.it/handle/10589/150010.

(Continued)

*Primary Examiner* — Forrest M Phillips
(74) *Attorney, Agent, or Firm* — Shumaker & Sieffert, P.A.

(57) ABSTRACT

In some examples, acoustic panels (such as for gas turbine engines) and techniques for forming acoustic panels. In some examples, the acoustic panel including a coversheet including an outer face, an inner face, and a plurality of apertures extend from the outer face to the inner face. The acoustic panel also includes a 3D-printed support layer including a lattice structure formed at least partially of a polymer, the lattice structure defining a plurality of cells of the support layer, wherein a first side of the support layer is coincident with the inner face of the coversheet.

20 Claims, 7 Drawing Sheets

(56) References Cited

U.S. PATENT DOCUMENTS

2020/0103139 A1\* 4/2020 Schiller .................. B60R 13/08
2023/0258132 A1\* 8/2023 Hodgson .............. G10K 11/172
　　　　　　　　　　　　　　　　　　　　181/222

OTHER PUBLICATIONS

Plastics Today Staff., "3D-Printed Metamaterial Could Lead to Lighter, Safer Cars", Feb. 10, 2021, 3 pp., Retrieved from www.PlasticsToday.com, Abstract only.

U.S. Appl. No. 17/661,435, filed Apr. 29, 2022, naming inventors Hodgson et al.

Office Action from U.S. Appl. No. 17/661,435 dated Mar. 8, 2024, 9 pp.

\* cited by examiner

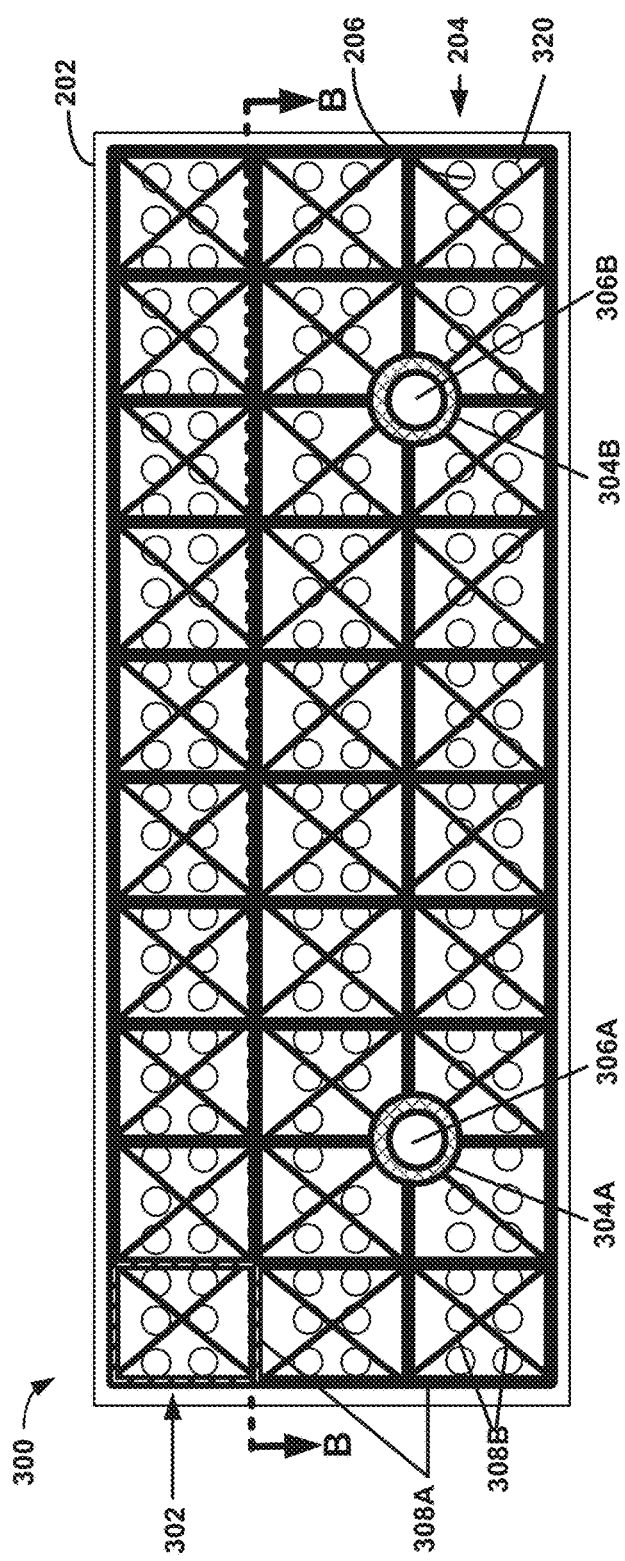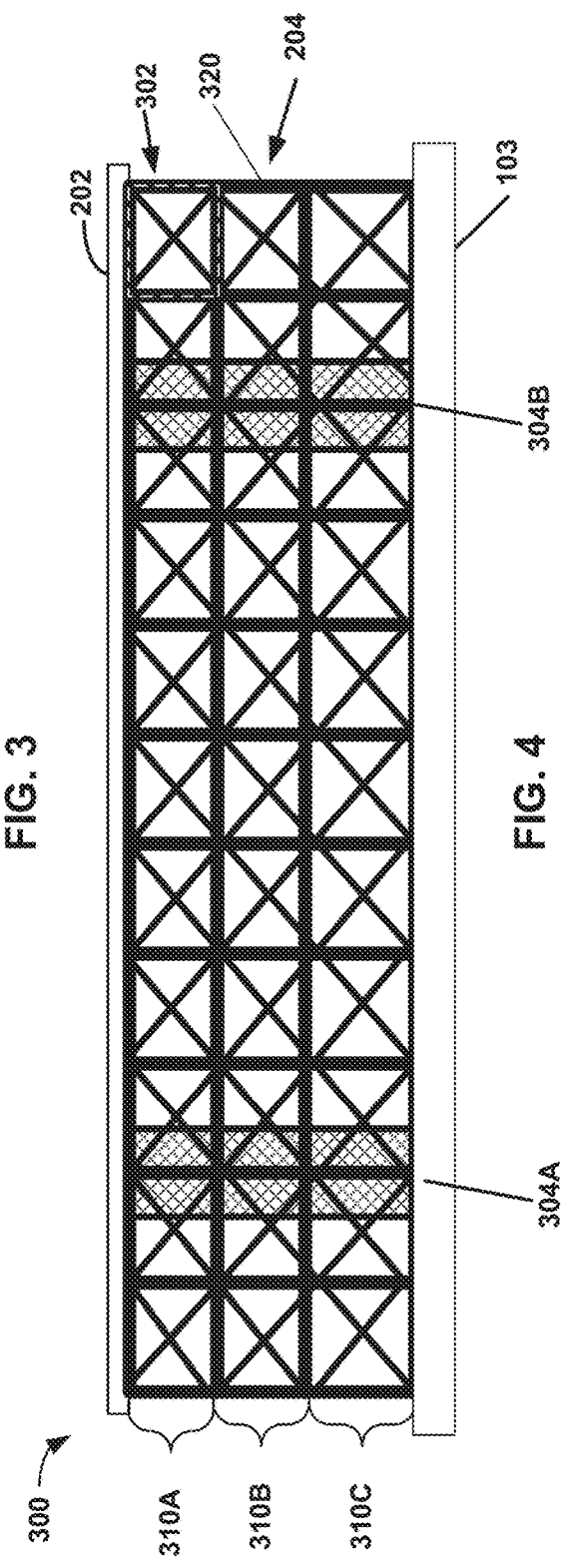
FIG. 3
FIG. 4

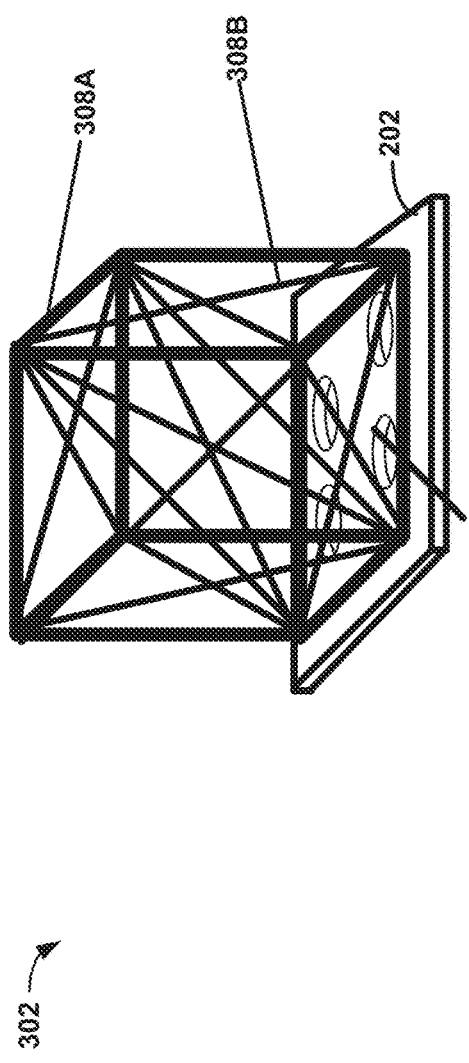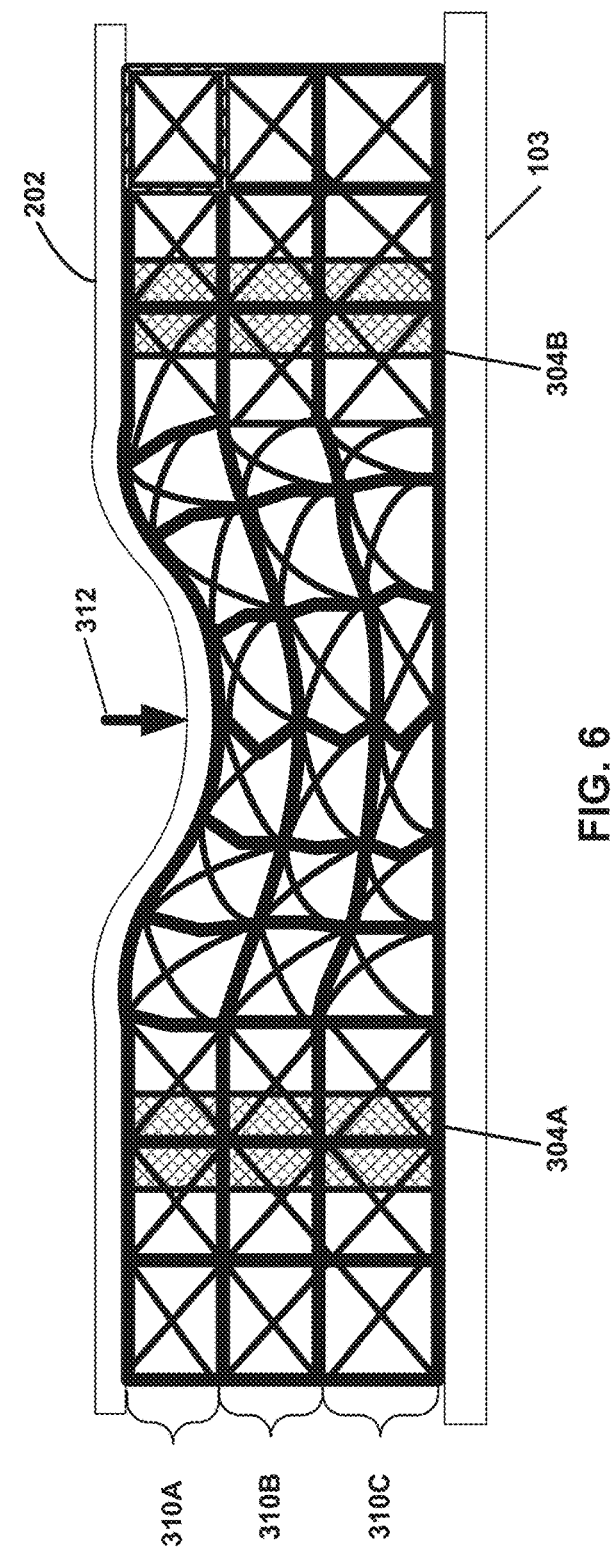

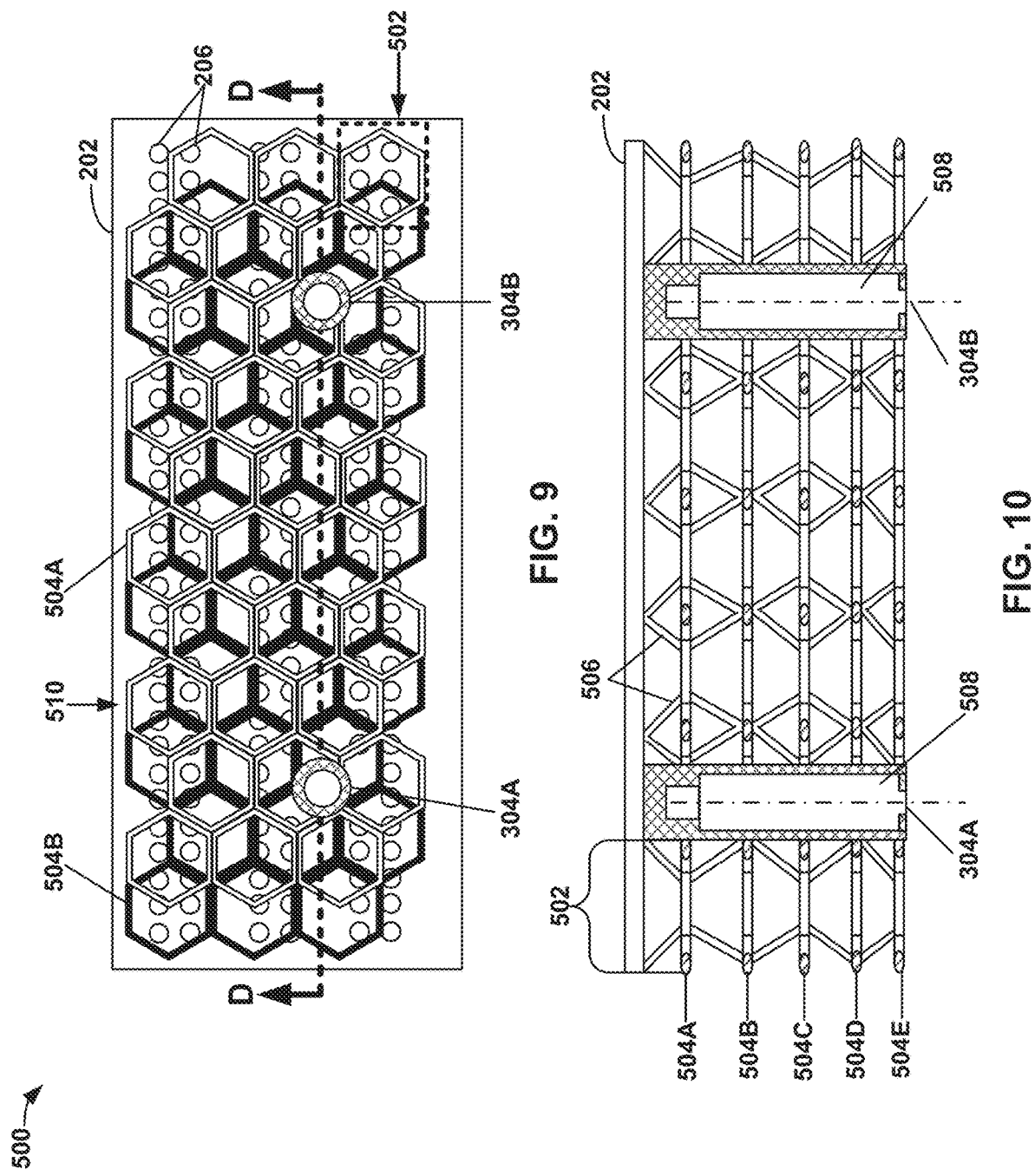

3D PRINTED ACOUSTIC PANEL WITH LATTICE STRUCTURE SUPPORT LAYER

TECHNICAL FIELD

This disclosure relates to acoustic panels for gas turbine engines.

BACKGROUND

Gas turbine engines used to propel vehicles, e.g., aircraft, often include a fan assembly or propeller that is drive by an engine core. In a fan assembly, the fan may blow air to provide part of the thrust for moving the aircraft. Fan assemblies typically include a bladed wheel mounted to a shaft coupled to the engine core. The bladed wheel of the fan assembly may include a plurality of airfoils in the form of fan blades coupled to a fan disc. Gas turbine engine may also include a fan case that surrounds the fan assembly. An inner surface of the fan case may define an outer wall of the bypass flow path. The inner surface may include one or more front acoustic panels (FAP) and one or more rear acoustic panels (RAP). These 'acoustic panels' are intended to reduce the sound or noise radiating from the gas turbine engine by absorbing some of the sound.

SUMMARY

The disclosure describes acoustic panels, e.g., for fan cases of gas turbine engines, and techniques for forming the acoustic panels. An acoustic panel as described herein may include a coversheet and a 3D-printed support layer. The 3D-printed support layer may include a lattice structure formed at least partially of a polymer, the lattice structure defining a plurality of cells of the support layer. The acoustic panels may be relatively lightweight, and the support layer may be sufficiently flexible to elastically deform when struck by objects (e.g., birds, ice, fan blades, or the like) and increase the resistance of the acoustics panels to fracture.

In some examples, this disclosure describes an acoustic panel comprising a coversheet comprising an outer face, an inner face, and a plurality of apertures extending from the outer face to the inner face. The acoustic panel also comprises a 3D-printed support layer comprising a lattice structure formed at least partially of a polymer, the lattice structure defining a plurality of cells of the support layer, wherein a first side of the support layer is coincident with the inner face of the coversheet.

In some examples, this disclosure describes a method of manufacturing an acoustic panel, the method comprising 3D printing a support layer on an inner face of a coversheet, wherein the coversheet comprises the inner face, an outer face, and a plurality of apertures extending from the outer face to the inner face, wherein the support layer comprises a lattice structure formed at least partially of a polymer, the lattice structure defining a plurality of cells of the support layer, and wherein a first end of the support layer is attached to the inner face of the coversheet.

The details of one or more examples are set forth in the accompanying drawings and the description below. Other features, objectives, and advantages will be apparent from the description and drawings, and from the claims.

BRIEF DESCRIPTION OF DRAWINGS

Reference is made to the attached drawings, wherein elements having the same reference numeral designations represent similar elements throughout.

FIG. 3 is a conceptual diagram illustrating an example acoustic panel including a coversheet and a support layer including a plurality of cells including a lattice structure.

FIG. 4 is a conceptual diagram illustrating a schematic cross-sectional view of the example acoustic panel of FIG. 3 taken along line B-B.

FIG. 5 is a conceptual diagram illustrating an example cell of the example acoustic panel of FIG. 3.

FIG. 6 is a conceptual diagram illustrating the example acoustic panel of FIG. 3 deforming in response to a force exerted upon the coversheet.

FIG. 9 is a conceptual diagram illustrating another example acoustic panel including a coversheet and a support layer including a lattice structure defining a plurality of cells.

FIG. 10 is a conceptual diagram illustrating a schematic cross-sectional view of the example acoustic panel of FIG. 9 taken along line D-D.

DETAILED DESCRIPTION

This disclosure generally describes acoustic panels for gas turbine engines and techniques for forming acoustic panels for gas turbine engines. Example acoustic panels employed in turbofan engines may include front acoustic panels (FAP) and rear acoustic panels (RAP).

In operation, acoustic panels may reduce the noise generated by the gas turbine engine. At least some of the sound waves generated by the gas turbine engine may enter the acoustic panels, e.g., through a plurality of apertures in a coversheet of each acoustic panel. The sound waves may bounce around the inside of the support layer and exit the acoustic panels, e.g., through the plurality of apertures in each coversheet. The exiting sound waves may be out of phase with the sound waves reflected off of the coversheet and may at least partially cancel out through destructive interference.

In operation, acoustic panels may experience impact which may be caused by ice strikes (e.g., due to the separation of ice buildup on a rotating fan), bird ingestion, or the like. Such impacts may damage the acoustic panels, which may be referred to as foreign object damage (FOD), and necessitate replacement of the damaged panels, which may be a costly process. To avoid FOD, the example acoustic panels include elements (e.g., the support layer) configured to withstand impact from ice, bird or bird slurry, or the like.

Due to the nature of acoustic panels in gas turbine engines, it can be costly and/or time-consuming to manufacture the acoustic panels using traditional manufacturing techniques. This may be due to cost of setting up the requisite manufacturing tools to manufacture the acoustic panels. By using a 3D printing technique to manufacture the acoustic panels, the amount of time required to set up the manufacturing process can be reduced and the acoustic panels may be cheaper and/or faster to manufacture.

Figure 1:
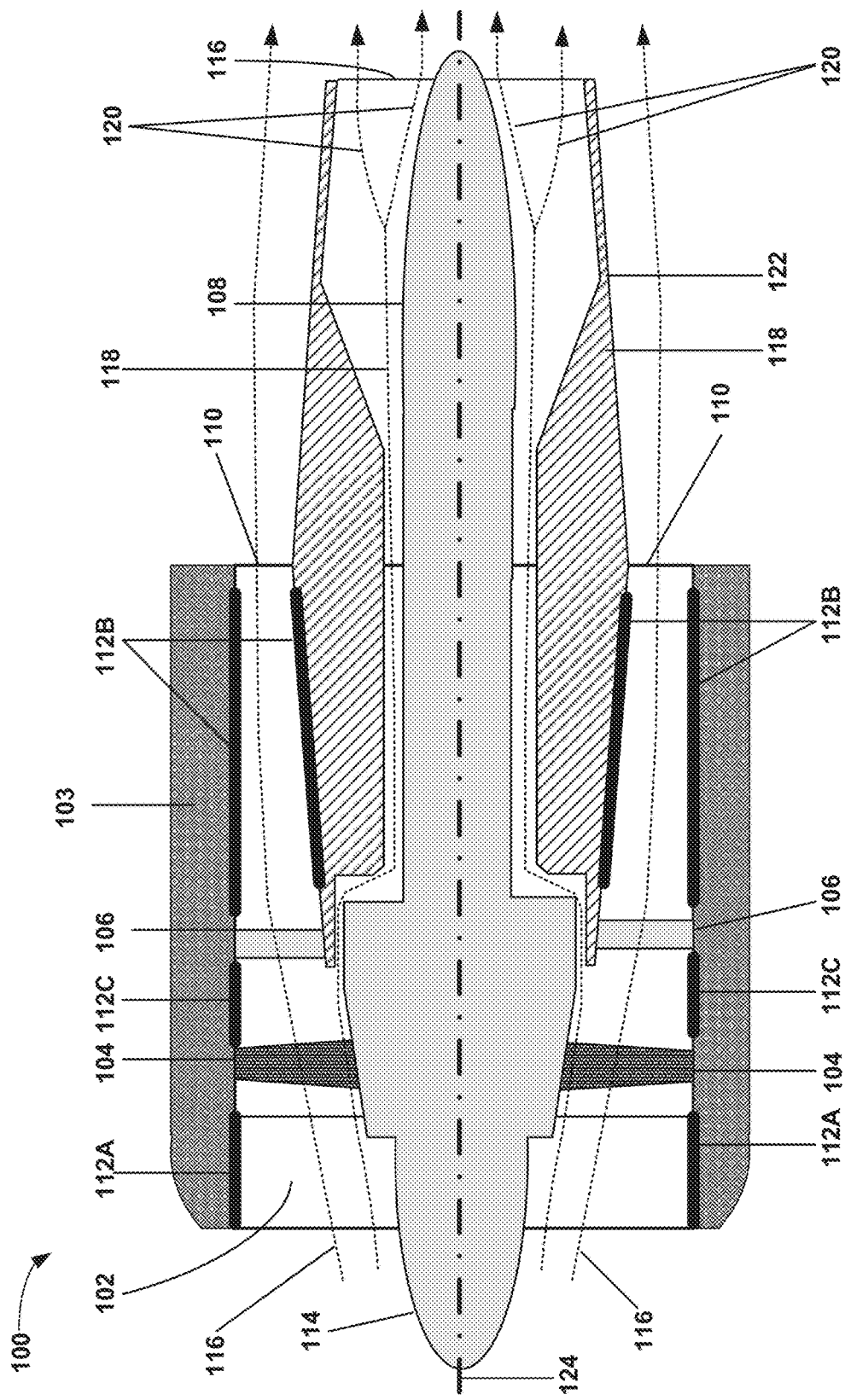
FIG. 1 is a schematic diagram illustrating a longitudinal cross-section view of an example gas turbine engine illustrating the positioning of acoustic panels within the aircraft engine.

FIG. 1 is a schematic diagram illustrating a longitudinal cross-section view of an example gas turbine engine 100 illustrating the positioning of one or more acoustic panels (e.g., acoustic panel 200 of FIG. 2) within gas turbine engine 100. Gas turbine engine 100 may include air intake 102, fan case 103, fan 104, stators 106, core flow system 108, fan bypass 110, engine exhaust duct 116, spinner 114, turbine casing 122, forward acoustic panels (FAP) 112A, and rear acoustic panels (RAP) 112B. Core flow system 108 may include one or more compressors (e.g., intermediate-pressure compressor, high-pressure compressor), a combustion chamber, and one or more turbines (e.g., high-pressure turbine, intermediate-pressure turbine, low-pressure turbine). A bypass system of gas turbine engine 100 may be configured to bypass core flow system 108 and may include fan case 103 and fan bypass 110. Spinner 114 (or nosecone) may be mounted to fan 204.

Thrust, which propels an aircraft, is generated in gas turbine engine 100 by both fan 104 and core flow system 108. Air enters the air intake 102 and flows substantially parallel to longitudinal axis 124, as illustrated by airflow 116. In some examples, airflow 116 may travel around spinner 114 and core flow system 108 and through fan bypass 110. Air may flow past a rotating fan (e.g., fan 104), which increase the air velocity to provide a portion of the thrust. A first portion of airflow 116 may pass fan 104 and enter core flow system 108, while a second portion enters fan bypass 110. Airflow 116 entering core flow system 108 (herein referred to as "airflow 118") may be compressed by one or more compressors, e.g., compressed by an intermediate-pressure compressor and then by a high-pressure compressor. Airflow 118 may then enter a combustion chamber where the air of airflow 118 is mixed with fuel and ignited. Airflow 118 then leaves the combustion chamber with an relatively elevated temperature and pressure and produce work to rotate one or more turbines, e.g., rotating high-pressure turbine, intermediate-pressure turbine, and low-pressure turbine, in succession. Airflow 118 then exits core flow system 108 through engine exhaust duct 116 as exhaust 120. The rotation of the one or more turbines may induce rotation of the one or more compressors and fan 104. Air that passes through fan bypass 110 does not undergo compression or combustion and does not produce work to rotate the one or more turbines but may contribute propulsive thrust to gas turbine engine 100. Fan case 103 may be a substantially annular structure around core flow system 108 and fan 104. In some examples, fan case 103 may be a nacelle.

In accordance with examples of this disclosure, at least one FAP 112A and at least one RAP 112B or RAP 112C may be attached to fan case 103. In some examples, as illustrated in FIG. 1, gas turbine engine 100 may include RAP 112B in at least two positions. For example, RAP 112B may be positioned within engine exhaust duct 116 and/or fan bypass 110. FAP 112A may be placed in front of fan 104. In some examples, FAP 112A, RAP 112B, and/or RAP 112C may be a single acoustic panel. For example, FAP 112A may be a single, annular, acoustic panel configured to cover the inner face of fan case 103 around the inner circumference of fan case 103. In other examples, FAP 112A may include two or more acoustic panels 200 configured to be secured to fan case 103 such that the two or more acoustic panels 200 cover the inner face of fan case 103 around the entire inner circumference of fan case 103. FAP 112A may be configured to cover the inner face of fan case 103 between a front face of gas turbine engine 100 and fan 104. FAP 112A may be attached to the inner face of fan case 103 through a plurality of attachment members. In some cases, FAP 112A may be attached directly to a metallic outer casing of fan case 103.

In some examples, RAP 112B around engine exhaust duct 116 may be configured to cover an inner face of engine exhaust duct 116 around the entire inner circumference of engine exhaust duct 116. RAP 112B may include one or more acoustic panels 200 configured to cover the inner face of engine exhaust duct 116, e.g., with one annular acoustic panel 200 or two or more acoustic panels 200. The inner face of engine exhaust duct 116 may include at least a portion or the entirety of the inner surface of engine exhaust duct 116 from a rearward edge of engine exhaust duct 116 to the rearmost turbine of core flow system 108.

RAP 112B around fan bypass 110 may be secured around an inner surface of fan case 103 or core flow system 108. In some examples, RAP 112B may include one or more acoustic panels 200 configured to cover at least a portion of the rearward inner surface of fan case 103 between stator 106 and a rearward edge of fan bypass 110. In other examples, RAP 112B may include one or more acoustic panels 200 configured to cover at least a portion of an area of the outer surface of core flow system 108 (e.g., a portion of a casing of core flow system 108) between stator 106 and a rearward edge of fan bypass 110.

In other examples, FAP 112A may be positioned in any other area of gas turbine engine 100 that is in front of fan 104. In some examples, RAP 112C may be attached to fan case 103 between fan 104 and stators 106.

Figure 2:
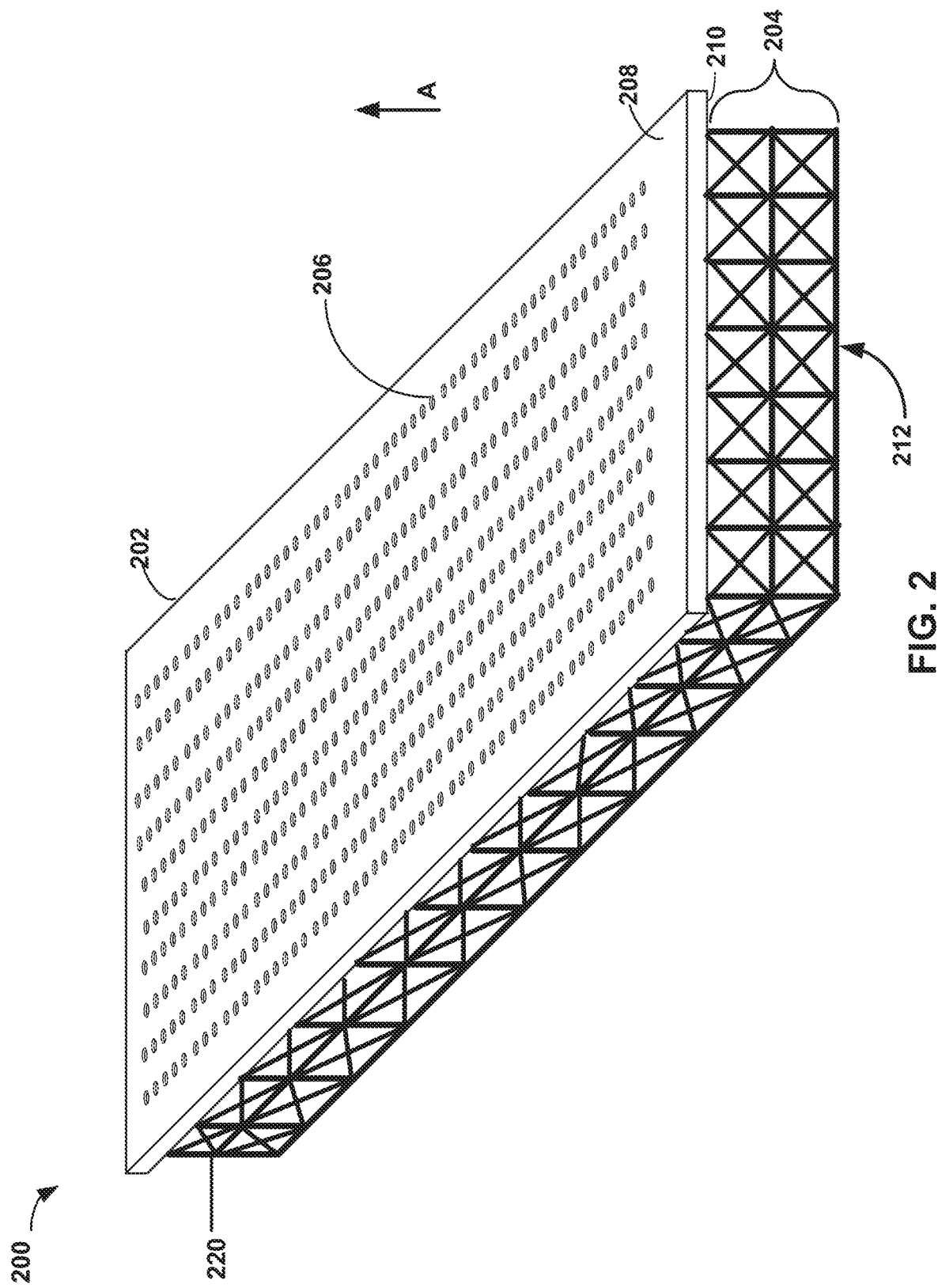
FIG. 2 is a partially schematic illustration of an acoustic panel configured in accordance with some examples of the present disclosure.

FIG. 2 is a partially schematic illustration of an example acoustic panel 200 configured in accordance with some examples of the present disclosure. Acoustic panel 200 of FIG. 2 is shown as a flat panel to simplify the illustration. In other examples, acoustic panels 200 may be curved to form the arc of a circle. Acoustic panel 200 may include coversheet 202 and support layer 204. Coversheet 202 may include outer face 208 and inner face 210. Support layer 204 may include a lattice structure 220 formed at least partially of a polymer, where the lattice structure 220 defines a plurality of cells (e.g., cell 302 of FIG. 5) of support layer 204. Coversheet 202 may be positioned on support layer 204 and support layer 204 may provide mechanical support for coversheet 202 and may contribute acoustic properties to acoustic panel 200. Support layer 204 may be attached to coversheet 202, e.g., to inner face 210 of coversheet 202 via a first side of support layer 204. In some examples, support layer 204 may be attached to coversheet 202 by attaching the first side of support layer 204 to inner face 210, e.g., via an adhesive, a mechanical attachment device, or the like. In some examples, support layer 204 may be attached to coversheet 202 by 3D printing support layer 204 directly onto inner face 210. As shown in FIG. 2, the first side of support layer 204 may be coincident with inner face 210 of coversheet 202. In some examples, when the first side of support layer 204 is coincident with inner face 210, at least a portion of lattice structure 220 defining the first side of support layer 204 is in direct contact with inner face 210. Acoustic panel 200 may not include a back sheet attached or otherwise connected to a second side 212 of support layer 204. In this manner, second side 212 of support layer 204 may be open rather than being covered by another sheet. When incorporated into a gas turbine engine 100 such as that shown in FIG. 1, the second side 212 may be coincident to a portion of the gas turbine engine 100. For example, all or a portion of the second side may be covered and coincident to a portion of fan casing 203.

Acoustic panel 200 may have a substantially rectangular prism (cuboid) shape, as illustrated in FIG. 2. In other examples, acoustic panel 200 may be formed into other three-dimensional (3-D) shapes to facilitate use of acoustic panel 200 in a gas turbine engine (e.g., gas turbine engine 100). In some examples, acoustic panel 200 may define one or more surfaces (e.g., outer face 208 of coversheet 202) that are substantially planar, as illustrated in FIG. 1. In other examples, acoustic panel 200 may include one or more curved surfaces to facilitate use of acoustic panel 200 in gas turbine engine 100, e.g., acoustic panel 200 may be curved such that outer face 208 is concave.

Coversheet 202 may have a sufficiently uniform thickness in a direction parallel to line A such that outer face 208 is substantially parallel to inner face 210. In other examples, at least some portions of coversheet 202 may have substantially different thicknesses to other portions of coversheet 202. For example, coversheet 202 may have a greater thickness in areas near the edges of acoustic panel 200 than in areas away from the edges of acoustic panel 200. In some examples, coversheet 202 may have a thickness of about 0.02 inches (in.) to about 0.04 in.

Coversheet 202 may be substantially rigid and configured to withstand FOD without fracture and/or deformation. Coversheet 202 may be manufactured with one or more polymers and/or composite polymers configured to withstand FOD without risk of fracture. In some examples, coversheet 202 may be manufactured with an epoxy matrix material or a composite glass fiber material (e.g., continuous fiber reinforced plastic). The fibers within the composite glass fiber material may fill up to 70% of the volume of coversheet 202. In other examples, coversheet may include a filled thermoplastic including chopped fibers. The chopped fibers may include carbon fibers and/or glass fibers. In some examples, the chopped fibers may fill up to 20% of the filled thermoplastic by weight and/or up to 15% of the filled thermoplastic by volume.

Coversheet 202 may define apertures 206 extending from outer face 208 to inner face 210. Apertures 206 may be configured to allow sound waves through coversheet 202. In some examples, each aperture 206 may have a consistent diameter as aperture 206 extends from outer face 208 to inner face 210. In other examples, apertures 206 may have a varying diameter as aperture 206 extends from outer face 208 to inner face 210. For example, apertures 206 may have a larger and/or smaller diameter at outer face 208 than at inner face 210. In some examples, coversheet 202 may define apertures 206 in a plurality of rows and columns, as illustrated in FIG. 2. In other examples, coversheet 202 may define the plurality of apertures 206 in different configurations (e.g., apertures 206 may be arranged in concentric circles, randomly, or other repeating geometric configurations). In some examples, apertures 206 may cover up to 20% of the surface area of coversheet 202. Apertures 206 may be formed in coversheet 202 prior to, during, or after attaching support layer 204 to coversheet 202.

In some examples, support layer 204 may be configured to elastically deform in response to the exertion of an external force upon coversheet 202 and to return to an original configuration after cessation of the external force. The external force may be the result of an ice strike, bird strike, or the like. For example, support layer 204 may compress towards the inner face of fan case of a gas turbine engine in response to the external force and return to the original position after the external force ceases. In some examples, support layer 204 may be configured to withstand vibrations, e.g., from gas turbine engine 100. Support layer 204 may be configured to withstand temperatures from about −60 degrees (° C.) to about 120° C.

Support layer 204 may include one or more polymers and may be manufactured using one or more 3D printing (also referred to as additive manufacturing) techniques. For example, the polymer material for support layer 204 may be printed/deposited directly onto inner surface 210 of coversheet 202, e.g., in addition to any binder or additives materials used as part of the 3D printing process. Lattice structure 220 is formed from the polymer material and defines the plurality of cells. Lattice structure 220 may contain a plurality of void volumes which facilitates the elastic deformation of support layer 204 in response to an external force acting upon coversheet 202. In some examples, the plurality of void volumes may cancel out at least some of the sound waves generated by gas turbine engine 100, e.g., by facilitating the sound waves bouncing around support layer 204. The plurality of cells define lattice structure 220 of support layer 204 may include one or more repeating unit cells. lattice structure 220 may be a plate-lattice structure or may be a truss-lattice structure. In some examples, each of the plurality of cells of lattice structure 220 may define one or more unit cells. In other examples, two or more of the plurality of cells of support layer 204 may define one unit cell of the lattice structure. In some examples, lattice structure 220 may be non-homogeneous in at least a portion of support layer 204. For example, portions of lattice structure 220 around one or more of the attachment members (e.g., attachment member 304 of FIG. 3) within support layer 204 may have relatively higher rigidity and strength values than portions of lattice structure 220 in other portions of support layer 204. In some examples, the rigidity and strength values of portions of lattice structure 220 may decrease (e.g., linearly) as the linear distance between the respective portion of lattice structure 220 and an attachment member increases.

In some examples, support layer 204 may also include a plurality of attachment members. The attachment members may be configured to secure acoustic panel 200 to portions of gas turbine engine 100, e.g., to the inner face of fan case 103. The attachment members may be configured to remain substantially rigid as other portions of support layer 204 elastically deform in response to an external force.

The one or more polymers used to form lattice structure 220 of support layer 204 may also be configured to withstand temperatures of about −60° C. to about 120° C. without substantial changes in material properties (e.g., the stress-strain curve of the polymer, the internal structure of the polymer, the Young's Modulus of the polymer). Polymers may include, but are not limited to, thermoplastics including polyether ether ketone (PEEK), polyaryletherketone (PAEK), polyphenylene sulfide (PPS), nylon (e.g., nylon 4-6), heat stabilized nylon, PEAK, or polyamide-imide (PAI). In some examples, PPS may be available under the trade name Fortron® available from the Celanese Corporation, Winona, Minnesota. In some examples, PAI may be available under the trade name Torlon®. In some examples, the polymers made include a fill material such as carbon fiber or glass fiber.

FIG. 3 is a conceptual diagram illustrating an example acoustic panel 300 including coversheet 202 and a support layer 204 including a plurality of cells 302 (shown with white dashed lines) including a lattice structure 320. FIG. 3 illustrates a top view of acoustic panel 300 from along line A of FIG. 2. Acoustic panel 300 of FIG. 3 is shown as a flat panel to simplify the illustration. In other examples, acoustic panels 300 may be curved to form the arc of a circle. The various components of acoustic panel 300 including, for example, coversheet 202, support layer 204, and the like may be substantially similar to the components of acoustic panel 200 described above, apart from any differences described below.

As described above with reference to FIG. 1, coversheet 202 may include a plurality of apertures 206 extending from outer face (e.g., outer face 208) to inner face (e.g., inner face 210). In some examples, support layer 204 may be secured to coversheet 202 such that there are portions of inner face 210 of coversheet 202 (e.g., around the edges of inner face 210, as illustrated in FIG. 3) where support layer 204 is not in contact with coversheet 202. In other examples, support layer 204 may be in contact with the entirety of inner face 210 of coversheet 202.

One or more attachment members 304A-B (collectively "attachment members 304) may be secured to coversheet 202, e.g., secured to inner face 210 of coversheet 202. Attachment members 304 may be configured to attach acoustic panel 300 to an example gas turbine engine (e.g., gas turbine engine 100). Acoustic panel 300 may include one, two, or three or more attachment members 304. Attachment members 304 may be positioned in portions of acoustic panel 300 where one or more of cells 302 of support layer 204 is connected to one or more other cells 302 of support layer 204. Attachment members 304 may be positioned equidistant to one or more other attachment members 304 and/or a center point of acoustic panel 300. In other examples, attachment members 304 may be positioned in acoustic panel 300 to correspond to the attachment points on fan case 103 of gas turbine engine 100. Attachment members 304 may include attachment recess 306A-B (collectively "attachment recess 306"). Attachment recess 306 may be configured to accept a mechanical attachment device (e.g., a bolt, a screw) to mechanically secure acoustic panel 300 to gas turbine engine 100.

In some examples, attachment members 304 may be secured to coversheet 202 prior to the 3D printing of support layer 204 onto coversheet 202. Attachment members 304 may be secured to coversheet 202 using an adhesive, e.g., an epoxy adhesive. Support layer 204 may be 3D printed separately and attached to coversheet 202 using an adhesive, e.g., an epoxy adhesive. In other examples, support layer 204 may be 3D printed directly onto coversheet 202, e.g., onto inner face 210 of coversheet 202.

In some examples, as illustrated in FIG. 3, Lattice structure 320 defines a plurality of unit cells. Each unit cell of lattice structure 320 may include a plurality of primary support struts 308A and a plurality of secondary support struts 308B. Primary support struts 308A may define the borders of unit cell. In some examples, as illustrated in FIG. 3, primary support struts 308A may also define cell 302. In some examples, primary support struts 308A (shown with the thicker lines in FIG. 3) may define the borders of unit cell and cell 302 as a cube. Each secondary support strut 308B (shown with the thinner lines in FIG. 3) may connect one primary support 308A to another primary support strut 308A. In some examples, secondary support struts 308B may connect one vertex of an unit cell to another vertex of the same unit cell (e.g., from one vertex of a cube to another vertex of a cube). Each unit cell of lattice structure 320 may be connected to at least one other unit cell of lattice structure 320, e.g., through primary support struts 308A or secondary support struts 308B. Each unit cell of lattice structure 320 may have the same structure as every other unit cell of lattice structure 320.

In some examples, primary support struts 308A may be configured to be substantially parallel and/or orthogonal to at least one edge of coversheet 202. In other examples, secondary support struts 308B may be configured to be substantially parallel and/or orthogonal to at least one edge of coversheet 202 in a first plane (e.g., a plane substantially parallel to coversheet 202).

FIG. 4 is a conceptual diagram illustrating a schematic cross-sectional view of the example acoustic panel 300 of FIG. 3 taken along line B-B. Cells 302 of lattice structure 320 may be configured into a plurality of cell layers 310A-C (collectively "cell layers 310"). Each cell layer 310 may contain the same number of cells 302. In other examples, a first cell layer (e.g., cell layer 310A) may have more and/or less cells 302 than a second cell layer (e.g., cell layer 310B or cell layer 310C). In some examples, cell layers 310 may contain cells 302 of the same structure and/or dimensions. In other examples, cell layer 310A may contain cells 302 of a different structure and/or dimensions than cell layer 310B or cell layer 310C. Support layer 104 of example acoustic panel 300 may contain one, two, or three or more cell layers 310. In some examples, a proximal face of first cell layer 310A may be coincident with inner face 210 of coversheet 202. In some examples, a proximal face of second cell layer 310B may be connected to a distal face of first cell layer 310A. In some examples, a distal end of attachment members 304 (e.g., an end farthest away from coversheet 102) may be coincidental to a distal face of the distalmost cell layer 310 (e.g., cell layer 310C).

In some examples, cell layers 310A-C may also be referred to as lattice layers 310A-C. A distal face of a first lattice layer (e.g., lattice layer 310A) may be coincident to inner face 210 of coversheet 202 and a proximal face of a second lattice layer (e.g., lattice layer 310B) may be connected to distal face of lattice layer 310A.

FIG. 5 is a conceptual diagram illustrating an example cell 302 of the example acoustic panel 300 of FIG. 3. As illustrated in FIG. 5, each vertex of cell 302 may be connected to every other vertex of cell 302, e.g., through primary support struts 308A and secondary support struts 308B. In other examples, each vertex of cell 302 may be connected to one or more other vertices of cell 302 through primary support struts 308A and at least one vertex of cell 302 through secondary support struts 308B. In some examples, cells 302 on the proximal-most cell layer (e.g., cell layer 310A of FIG. 4) may be configured to correspond to one or more apertures 206 of coversheet 202. In some examples, primary support strut 308A of cell 302 may be connected to and coincidental with primary support strut 308A of a second cell. In other examples, primary support strut 308A of cell 302 may also act as primary support strut 308A of a second cell.

In some examples, as illustrated in FIG. 5, example cell 302 may not be enclosed (e.g., each face of cell 302 does not include a wall covering the face). In other examples, each face of cell 302 may contain a thin wall configured to enclose cell 302. The thin wall configured to enclose cell 302 may be configured to elastically deform with cell 302 in response to the exertion of an external force. The thin walls may be configured to improve the attenuation of sound within cell 302 and support layer 204.

FIG. 6 is a conceptual diagram illustrating example acoustic panel 300 of FIG. 3 deforming in response to force 312 exerted upon coversheet 202. Force 312 may be the result of an ice strike, bird strike, or the like, and may be concentrated at a certain location on coversheet 202 or may be spread out over at least a portion of coversheet 202. As illustrated in FIG. 6, coversheet 202 may be configured to retain its shape in response to the exertion of force 312 upon coversheet 202.

At least one cell layer 310 may be configured to elastically deform in response to force 312 in manner illustrated in FIG. 6. In some examples, cell layers 310 may be configured to compress in response to force 312. In some examples, cell layers 310 may return to the original configuration (e.g., original structure, original dimensions) after the cessation of force 312. In some examples, attachment members 304 may also elastically deform in response to force 312 to facilitate movement of coversheet 102 towards gas turbine engine 200 (e.g., towards an inner face of fan case 203). For example, attachment members 304 may be configured to compress along a longitudinal axis of attachment members 304 in response to force 312.

Figure 7:
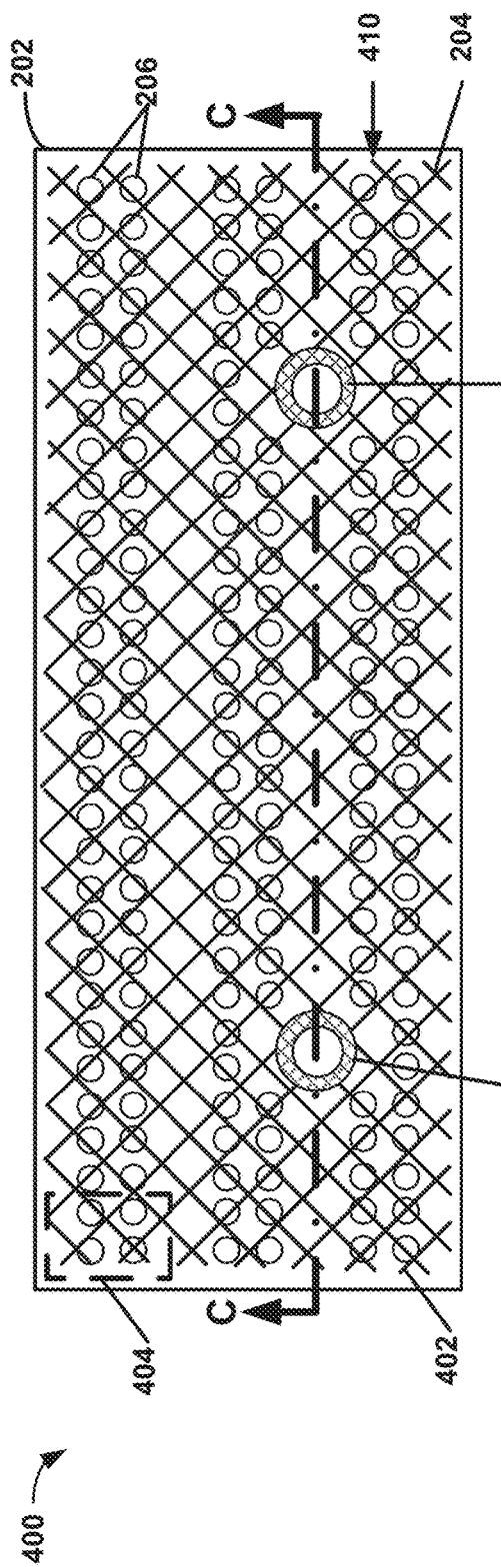
FIG. 7 is a conceptual diagram illustrating another example acoustic panel including a coversheet and a support layer including a lattice structure defining a plurality of cells.
Figure 8:
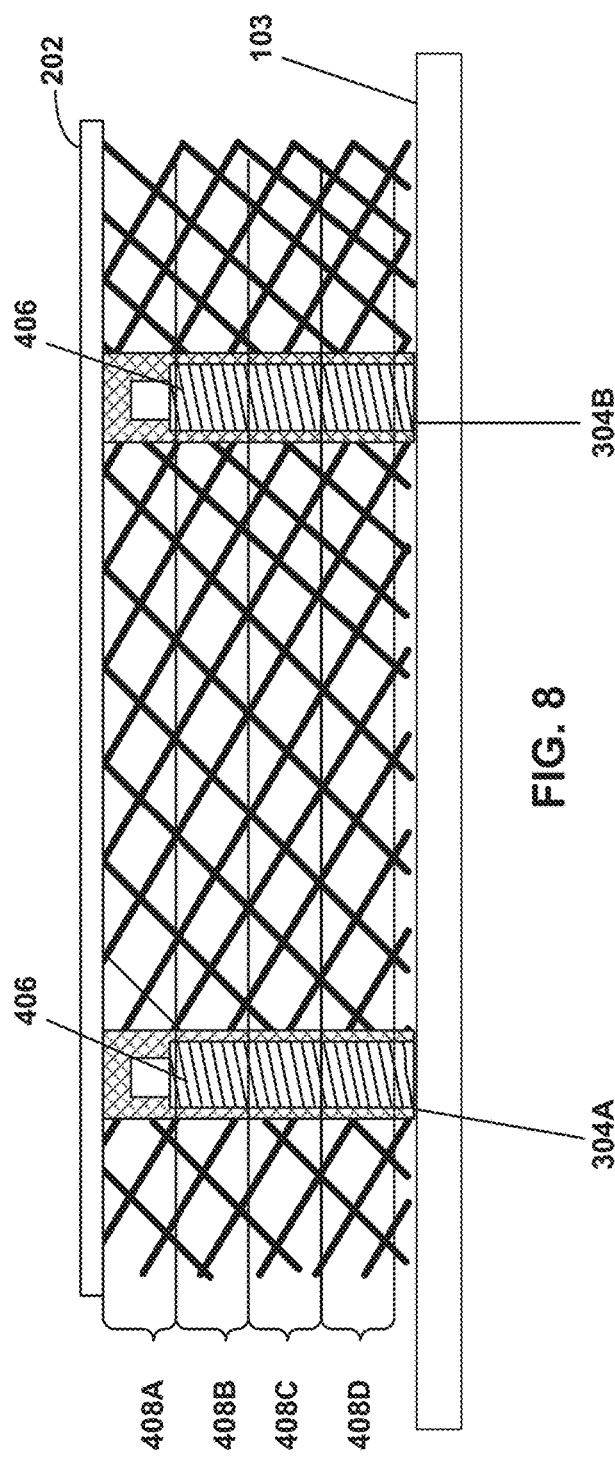
FIG. 8 is a conceptual diagram illustrating a schematic cross-sectional view of the example acoustic panel of FIG. 7 taken along line C-C.

FIG. 7 is a conceptual diagram illustrating another example acoustic panel 400 including coversheet 202 and a support layer 204 including a lattice structure 410 defining a plurality of cells 404. FIG. 8 is a conceptual diagram illustrating a schematic cross-sectional view of the example acoustic panel 400 of FIG. 7 taken along line C-C. The various components of acoustic panel 400 including, for example, coversheet 202, support layer 204, and the like may be substantially similar to the components of acoustic panel 200 described above, apart from any differences described below.

In some examples, as illustrated in FIG. 7, cell 404 may define one or more unit cells. Lattice structure 410 may only contain a plurality of support struts 402. Each support strut 402 may be orthogonal to one or more other support struts 402. In other examples, each support strut 402 may be parallel to one or more other support struts 402. Support layer 204 may include cell layers 408A-D, each of which may contain a plurality of cells 404. In some examples, as illustrated in FIG. 7, attachment members 304 may include internal threads 406 to facilitate the use of a mechanical attachment device (e.g., a screw) to mechanically secure acoustic panel 400 to gas turbine engine 100. In some examples, internal threads 406 may be the same material as attachment members 304. In other examples, internal threads 406 may be of a different material (e.g., a metallic alloy such as alloy steel, stainless steel, or aluminum alloy) which is incorporated into attachment members 304, e.g., with an insert.

FIG. 9 is a conceptual diagram illustrating another example acoustic panel 500 including coversheet 202 and support layer 204 including a lattice structure 510 which defines a plurality of cells 502. FIG. 10 is a conceptual diagram illustrating a schematic cross-sectional view of the example acoustic panel 500 of FIG. 9 taken along line D-D. The various components of acoustic panel 500 including, for example, coversheet 202, support layer 204, and the like may be substantially similar to the components of acoustic panel 200 described above, apart from any differences described below.

In some examples, as illustrated in FIG. 9, each cell 502 of support layer 204 may be define by a unit cell. Each unit cell of lattice structure 510 may be a hexagonal prism. In other examples, each unit cell of lattice structure 510 may be a half-hexagonal prism. Each unit cell of lattice structure 510 may be defined by a plurality of support struts 506.

Attachment members 304 may be configured to include attachment recess 508 configured to receive a mechanical attachment device (e.g., a bolt). Attachment recess 508 may be configured to retain a mechanical attachment device to mechanically secure acoustic panel 500 to gas turbine engine 100.

In some examples, lattice structure 510 may define support strut layers 504A-E (collectively "strut layers 504"). Each strut layer 504 may be defined by a plurality of support struts 506 and may be configured to define at least a number of the vertices of a plurality of unit cells. Support struts 506 may connect to vertices and other support struts 506 at strut layers 504. Each strut layer 504 may be substantially parallel to coversheet 202 (e.g., inner face 210 of coversheet 202).

Figure 11:
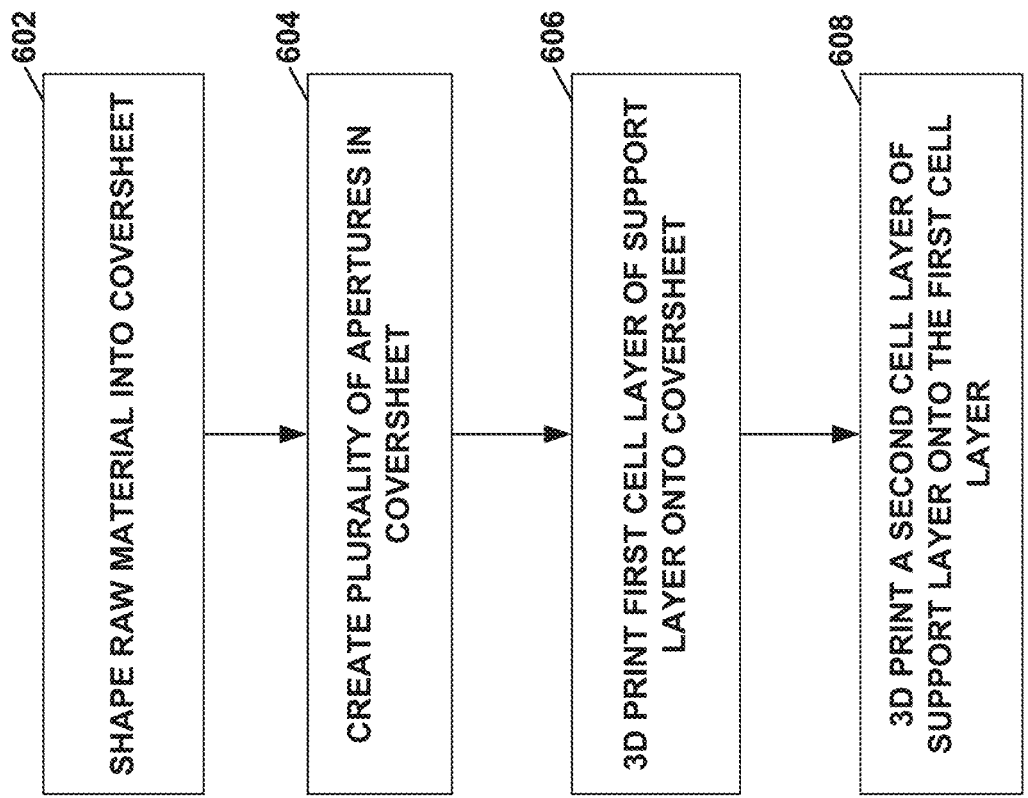
FIG. 11 is a flowchart illustrating an example method for manufacturing an acoustic panel in accordance with some examples of the present disclosure.

FIG. 11 is a flowchart illustrating an example method for manufacturing an acoustic panel (e.g., acoustic panel 200) in accordance with some examples of the present disclosure. A raw material may be shaped into a coversheet (e.g., coversheet 202) (602). The method of forming the raw material into the coversheet may depend on the type of raw material. For example, a thermoplastic material with a relatively low amount of fiber reinforcing may be acquired as a pre-formed thin sheet, heated and then plastically deformed into the desired shape for the coversheet. In other examples, a raw material that is a non-cured thermoset plastic (e.g., epoxy including fiber reinforcing) may be cured on a mold surface to the desired shape. With a relatively thin desired shape for the coversheet, the raw material may first be cured on a flat surface and later applies a force to plastically deform the cured raw material. The method of FIG. 11 may include the use of any suitable techniques for plastic fabrication or other relevant technologies. The techniques may be selected based on the particular type of raw materials. The raw material may be shaped into coversheet 202 by removing (e.g., with a cutting instrument) portions of coversheet material to form the coversheet material into the proper dimensions and to form the apertures (e.g., aperture 206). In other examples, the method of FIG. 11 may involve exerting a force on coversheet 202 while coversheet 202 is under the exertion of the heat and/or pressure to plastically deform coversheet 202. Coversheet material may be shaped into a plurality of shapes configured to fit into a particular position on gas turbine engine 100 (e.g., any portion of FAP 112A, RAP 112B, and/or RAP 112C as illustrated in FIG. 1).

The example method may also include creating a plurality of apertures (e.g., apertures 206) in coversheet 202 (604). The example method may include creating apertures 206 using a puncturing instrument or a cutting instrument. In some examples, apertures 206 may be created as a part of shaping a coversheet material into coversheet 202. In other examples, apertures 206 may be created as part of creating a coversheet material. In other examples, apertures 206 may be created as a part of creating the support layer (e.g., support layer 204)

The example method includes 3D printing a first layer of support layer 204 onto coversheet 202 (606). In some examples, the first layer of support layer 204 is 3D printed directly onto coversheet 202 (e.g., inner face 210 of coversheet 202). Support layer 204 may include polymers configured to attach to coversheet 202 when the polymers are 3D printed onto coversheet 202. In other examples, support layer 204 may be 3D printed separately and later attached to coversheet 202, e.g., via an adhesive, a mechanical attachment device, or the like. The 3D printing of support layer 204 may be done through any of a plurality of 3D printing techniques including, e.g., a blown powder technique, a powder bed fusion technique, or a fused deposition modeling technique. Blown powder techniques may involve outputting a powder from a printer head and using a laser attached to the printer head to fuse the powder to coversheet 202. In some examples, the powder used in the blown powder techniques may include any of a plurality of polymers that may be used to form support layer 204. Fused deposition modeling techniques may include extruding a filament through a heated printer head onto a printing surface. In some example 3D printing processes like fused deposition modeling, support layer 204 may be formed by sequentially depositing discrete layers of material on each other until the combination of the layers form the desired structure. The filament used in fused deposition modeling techniques may include any of a plurality of polymers that may be used to form support layer 204.

Blown powder techniques may involve outputting a powder from a printer head and using a laser or other energy source attached or separate from the printer head to fuse the powder together as a track of material on coversheet 202. Respective layers of material that are built upon in the layer by layer process may be made of one or more tracks of material. In some examples, the powder used in the blown powder techniques may include any of the plurality of polymers that may be used to form support layer 204.

Fused deposition modeling techniques may include extruding a filament through a heated printer head onto a printing surface. The deposited material may solidify to form the individual layers of material that combine to form support layer 204. The filament used in fused deposition modeling techniques may include any of a plurality of polymers that may be used to form support layer 204.

Powder bed fusion techniques may include depositing a layer of the powdered 3D printing material onto a printing surface and melting the powdered material to form the individual layers of material that combine to form support layer 204. The filaments used in powder bed fusion techniques may include any of a plurality of polymers that may be used to form support layer 204.

Support layer 204 may comprise a plurality of layers (e.g., lattice layers 310, strut layers 504) and each layer may be connected to at least one other layer. Once the first layer of support layer 204 is printed, the example method includes 3D printing a second layer on top of the first layer of support layer 204 (608). In some examples, 3D printing support layer 104 may also include 3D printing attachment members 304 onto coversheet 202. Attachment member 304 may be 3D printed onto coversheet 202 using any 3D printing technique, including the plurality of techniques discussed above. In some examples, after the entire support layer 204 is printed onto coversheet 202, the example method may further include attaching acoustic panel 200 to a gas turbine engine (e.g., to a fan case 103 of gas turbine engine 100).

The above detailed descriptions of examples of the technology are not intended to be exhaustive or to limit the technology to the precise form disclosed above. Although specific examples of the technology are described above for illustrative purposes, various equivalent modifications are possible within the scope of the technology, as those skilled in the relevant art will recognize. For example, while steps are presented in a given order, alternative examples may perform steps in a different order. The various examples described herein may also be combined to provide further examples. All references cited herein are incorporated by reference as if fully set forth herein.

Various examples have been described. These and other examples are within the scope of the following clauses and claims.

Clause 1: an acoustic panel comprising: a coversheet comprising: an outer face; an inner face; and a plurality of apertures extending from the outer face to the inner face; and a 3D-printed support layer comprising: a lattice structure formed at least partially of a polymer, the lattice structure defining a plurality of cells of the support layer, wherein a first side of the support layer is coincident with the inner face of the coversheet.

Clause 2: the acoustic panel of clause 1, wherein the lattice structure comprises a plate-lattice structure.

Clause 3: the acoustic panel of clauses 1 or 2, wherein the support layer is 3D-printed directly on the inner face of the coversheet.

Clause 4: the acoustic panel of any of clauses 1-3, wherein the support layer is configured to elastically deform in response to a force acting upon the outer face of the coversheet.

Clause 5: the acoustic panel of any of clauses 1-4, wherein the first side of the support layer is connected to the inner face of the coversheet using an adhesive.

Clause 6: the acoustic panel of any of clauses 1-5, wherein the polymer comprises a thermoplastic.

Clause 7: the acoustic panel of clause 6, wherein the thermoplastic comprises polyphenylene sulfide.

Clause 8: the acoustic panel of any of clauses 1-7, wherein the coversheet comprises a thermoset polymer with fiber reinforcements.

Clause 9: the acoustic panel of any of clauses 1-8, wherein the support layer further comprises a plurality of attachment members, wherein each of the plurality of attachment members is positioned between at least some of the plurality of cells.

Clause 10: the acoustic panel of any of clause 1-9, wherein the coversheet comprises a continuous fiber reinforced plastic.

Clause 11: the acoustic panel of any of clauses 1-10, wherein at least some of the plurality of cells are arranged in a first lattice layer and a second lattice layer, where a proximal face of the first lattice layer is coincident with the inner face of the coversheet, and wherein a proximal face of the second lattice layer is connected to a distal face of the first lattice layer.

Clause 12: the acoustic panel of clause 11, wherein each of the plurality of cells contains at least a portion of the lattice structure, and wherein each cell comprises: a plurality of struts comprising polymer, the plurality of struts configured to define the portion of the lattice structure contained within the cell.

Clause 13: a method of manufacturing an acoustic panel, the method comprising: 3D printing a support layer on an inner face of a coversheet, wherein the coversheet comprises the inner face, an outer face, and a plurality of apertures extending from the outer face to the inner face, wherein the support layer comprises a lattice structure formed at least partially of a polymer, the lattice structure defining a plurality of cells of the support layer, and wherein a first end of the support layer is attached to the inner face of the coversheet.

Clause 14: the method of clause 13, wherein the lattice structure comprises a plate-lattice structure.

Clause 15: the method of clauses 13 or 14, wherein the support layer is 3D-printed directly on the inner face of the coversheet.

Clause 16: the method of any of clauses 13-14, wherein the support layer is configured to elastically deform in response to a force acting upon the outer face of the coversheet.

Clause 17: the method of any of clauses 13-16, wherein the polymer comprises a thermoplastic.

Clause 18: the method of clause 17, wherein the polymer comprises polyphenylene sulfide.

Clause 19: the method of any of clause 13-18, wherein the coversheet comprises a thermoset polymer with fiber reinforcements.

Clause 20: the method of any of clauses 13-19, wherein forming the support layer comprises forming a plurality of attachment members, wherein each of the plurality of attachment members is positioned between at least some of the plurality of cells.

Clause 21: the method of any of clauses 13-20, wherein at least some of the plurality of cells are arranged in a first lattice layer and a second lattice layer, where a proximal face of the first lattice layer is coincident with the inner face of the coversheet, and wherein a proximal face of the second lattice layer is connected to a distal face of the first lattice layer.

Clause 22, the method of any of clauses 13-21, wherein each of the plurality of cells contains at least a portion of the lattice structure, and wherein each cell comprises: a plurality of struts comprising polymer, the plurality of struts configured to define the portion of the lattice structure contained within the cell.

What is claimed is:

1. An acoustic panel comprising:
   a coversheet comprising:
      an outer face;
      an inner face; and
      a plurality of apertures extending from the outer face to the inner face; and
   a 3D-printed support layer comprising:
      a lattice structure formed at least partially of a polymer, the lattice structure defining a plurality of cells of the support layer, wherein a first side of the support layer is coincident with the inner face of the coversheet, and wherein the support layer is configured to elastically deform in response to a force acting upon the outer face of the coversheet.

2. The acoustic panel of claim 1, wherein the lattice structure comprises a plate-lattice structure.

3. The acoustic panel of claim 1, wherein the support layer is 3D-printed directly on the inner face of the coversheet.

4. The acoustic panel of claim 1, wherein the lattice structure comprises:
   a plurality of primary support struts defining borders of each cell of the plurality of cells, wherein each primary support strut is connected to at least two other primary support struts of the plurality of primary supports struts at a vertex of a plurality of vertices of a cell of the plurality of cells; and
   a plurality of secondary support struts, each secondary support struts extending from a first end to a second end, and wherein for each second support strut, the first end is connected to a first vertex of a cell of the plurality of cells and the second end is connected to a second vertex of the cell, the second vertex being different from the first vertex.

5. The acoustic panel of claim 4, wherein each primary support strut of the plurality of primary support struts is configured to be substantially parallel or orthogonal to one or more of the outer face or the inner face.

6. The acoustic panel of claim 1, wherein the first side of the support layer is connected to the inner face of the coversheet using an adhesive.

7. The acoustic panel of claim 1, wherein the polymer comprises a thermoplastic.

8. The acoustic panel of claim 7, wherein the thermoplastic comprises polyphenylene sulfide.

9. The acoustic panel of claim 1, wherein the support layer further comprises a plurality of attachment members, wherein each of the plurality of attachment members is positioned between at least some of the plurality of cells.

10. The acoustic panel of claim 1, wherein at least some of the plurality of cells are arranged in a first lattice layer and a second lattice layer, wherein a proximal face of the first lattice layer is coincident with the inner face of the coversheet, and wherein a proximal face of the second lattice layer is connected to a distal face of the first lattice layer.

11. The acoustic panel of claim 10, wherein each of the plurality of cells contains at least a portion of the lattice structure, and wherein each cell comprises:
   a plurality of struts comprising polymer, the plurality of struts configured to define the portion of the lattice structure contained within the cell.

12. A method of manufacturing an acoustic panel, the method comprising:
   3D printing a support layer on an inner face of a coversheet, wherein the coversheet comprises the inner face, an outer face, and a plurality of apertures extending from the outer face to the inner face, wherein the support layer comprises a lattice structure formed at least partially of a polymer, the lattice structure defining a plurality of cells of the support layer, and wherein a first end of the support layer is attached to the inner face of the coversheet, and wherein the support layer is configured to elastically deform in response to a force acting upon the outer face of the coversheet.

13. The method of claim 12, wherein the lattice structure comprises a plate-lattice structure.

14. The method of claim 12, wherein 3D printing the support layer on the inner face of the coversheet comprises 3D printing the support layer directly on the inner face of the coversheet.

15. The method of claim 12, wherein the polymer comprises a thermoplastic.

16. The method of claim 15, wherein the polymer comprises polyphenylene sulfide.

17. The method of claim 12, wherein 3D printing the support layer comprises forming a plurality of attachment members, wherein each of the plurality of attachment members is positioned between at least some of the plurality of cells.

18. The method of claim 12, wherein at least some of the plurality of cells are arranged in a first lattice layer and a second lattice layer, where a proximal face of the first lattice layer is coincident with the inner face of the coversheet, and wherein a proximal face of the second lattice layer is connected to a distal face of the first lattice layer.

19. The method of claim 12, wherein each of the plurality of cells contains at least a portion of the lattice structure, and wherein each cell comprises:
   a plurality of struts comprising polymer, the plurality of struts configured to define the portion of the lattice structure contained within the cell.

20. An acoustic panel comprising:
   a coversheet comprising:
      an outer face;
      an inner face; and
      a plurality of apertures extending from the outer face to the inner face; and
   a 3D-printed support layer comprising:
      a lattice structure formed at least partially of a polymer, the lattice structure defining a plurality of cells of the support layer, wherein a first side of the support layer is coincident with the inner face of the coversheet, and wherein at least some of the plurality of cells are arranged in a first lattice layer and a second lattice layer, wherein a proximal face of the first lattice layer is coincident with the inner face of the coversheet, and wherein a proximal face of the second lattice layer is connected to a distal face of the first lattice layer.

* * * * *